United States Patent [19]

Kono et al.

[11] 4,167,757
[45] Sep. 11, 1979

[54] TELEVISION RECEIVER

[75] Inventors: Kenichiro Kono, Tokyo; Yoshio Ogawa, Yokohama, both of Japan

[73] Assignee: Sony Corporation, Tokyo, Japan

[21] Appl. No.: 905,452

[22] Filed: May 12, 1978

[30] Foreign Application Priority Data

May 16, 1977 [JP] Japan .............................. 52-62349[U]

[51] Int. Cl.² .......................... H04N 5/64; H04N 5/645
[52] U.S. Cl. ..................................... 358/254; 358/93; 358/248; 312/7 TV; D14/1; D14/21
[58] Field of Search .................. 358/254, 93, 248, 249; 312/7 TV; D14/1, 21

[56] References Cited

U.S. PATENT DOCUMENTS 2,404,030  7/1946  Browne .................................. 358/248
2,570,738  10/1951  Wikkenhauser ..................... 358/248

FOREIGN PATENT DOCUMENTS 1468695  1/1967  France ................................. 358/254

Primary Examiner—Howard W. Britton
Attorney, Agent, or Firm—Lewis H. Eslinger; Alvin Sinderbrand

[57] ABSTRACT

A television receiver is provided with a cabinet having a circular opening in a front panel thereof, a frame having a generally cylindrical outer surface and being mounted for rotation about the center of the circular opening with the cylindrical outer surface of the frame projecting forwardly from the front panel, a cathode ray tube disposed within the cabinet and attached to the frame for rotation with the latter, cooperatively engageable stop elements on the cabinet and frame, respectively, for limiting to a predetermined angular range the turning of the frame and cathode ray tube relative to the cabinet, and a detent arrangement on the frame and cabinet, respectively, for yieldably resisting turning of the frame at a plurality of angularly spaced apart locations within the predetermined range of turning.

16 Claims, 6 Drawing Figures

TELEVISION RECEIVER

BACKGROUND OF THE INVENTION

1. Field of the Invention

This invention relates to television receivers, and more particularly is directed to a television receiver which permits the picture or image on its screen to be comfortably viewed regardless of the orientation of the viewer relative to the cabinet of the television receiver.

2. Description of the Prior Art

As television has become increasingly popular, television receivers, particularly of the portable type, have been provided to permit the viewing thereof almost without limitation in respect to the location of the receiver while being viewed and/or the conditions under which the receiver is viewed. Thus, for example, portable television receivers are now provided to permit viewing of the image or picture while traveling in an automobile, boat or other conveyance. In such cases, the space available to accommodate the receiver may be limited either vertically or laterally, and, therefore, the receiver may have to be disposed with different portions of the cabinet located at the top thereof for different locations of use. As a result of the foregoing, if the cathode ray tube is fixed relative to the cabinet of the television receiver, the top of the picture displayed on the screen or face plate of the cathode ray tube may not always be directed upwardly for presenting the picture in a proper orientation relative to viewers disposed in upright positions. Further, even if the top of the picture on the screen of the cathode ray tube is directed upwardly, the orientation of the picture relative to the viewer may be incorrect if, as is often the case, the viewer is lying on his side or in a prone position.

In order to permit the maintenance of a desired orientation of the television picture relative to the viewer under the conditions mentioned above, a television receiver has been proposed in which the cathode ray tube is rotatable within the cabinet for varying the position of the top of the displayed picture relative to the cabinet. For example, in Japanese Published Utility Model Application No. 13050/1965, a television receiver is disclosed in which a cathode ray tube is turnable relative to its cabinet in opposite directions through approximately 45° from a normal or central position. With the foregoing arrangement, a viewer lying in bed or otherwise in a prone position can always view the picture or image on the screen of the cathode ray tube with the top of such picture in its accustomed position relative to the viewer so as to eliminate the fatigue that is otherwise encountered as a result of the sidewise viewing of a television picture. However, the described television receiver has a rectangular frame for holding the cathode ray tube and, by reason of such configuration of the frame, the desired turning of the cathode ray tube relative to the cabinet cannot be conveniently effected.

In another Japanese Published Utility Model Application No. 20272/1970, there is disclosed a television receiver in which the cathode ray tube is fixed relative to the cabinet, but a deflection yoke for causing the electron beam or beams to scan the screen in a predetermined raster is rotatable around the cathode ray tube so as to correspondingly change the orientation of the raster relative to the screen or face plate of the tube. Thus, by turning the deflection yoke relative to the cathode ray tube, the position of the top of the picture or image formed on the screen relative to the cabinet can be changed. However, with the foregoing arrangement involving a rotatable deflection yoke, it is difficult to maintain the latter in an accurately predetermined position and problems are encountered in employing such arrangement with a conventional cathode ray tube of rectangular configuration.

OBJECTS AND SUMMARY OF THE INVENTION

Accordingly, it is an object of this invention to provide a television receiver with a rotatable cathode ray tube which overcomes the previously mentioned problems.

More particularly, it is an object of this invention to provide an improved television receiver with a cathode ray tube which is rotatable relative to the receiver cabinet so as to permit the picture displayed on the screen of the tube to be conveniently viewed with the correct orientation of such picture relative to the viewer.

A further object is to provide a television receiver, as aforesaid, which is of relatively simple construction and easily assembled so as to permit its economical production.

Still another object is to provide a television receiver, as aforesaid, in which the rotation of the cathode ray tube relative to the cabinet is suitably limited so as to avoid damage to the various electrical connections required for proper operation of the cathode ray tube.

A still further object is to provide a television receiver, as aforesaid, with an antenna which is so located in respect to the cabinet as to permit the disposition of the antenna in any desired direction for efficient reception of broadcast signals in all of the various possible orientations of the cabinet.

In accordance with an aspect of this invention, a television receiver comprises a cabinet having a panel with a circular opening therein, a frame having a generally cylindrical outer surface and being mounted for rotation about the center of the circular opening in the panel with the cylindrical outer surface of the frame projecting forwardly from the panel, a cathode ray tube within the cabinet and being attached to the frame for rotation with the latter, cooperatively engageable stop means on the cabinet and frame, respectively, for limiting the turning of the frame and cathode ray tube relative to the cabinet to within a predetermined angular range, and cooperative detent means on the frame and cabinet, respectively, for providing yieldable resistance to turning of the frame relative to the cabinet at a plurality of angularly spaced apart locations within such predetermined range of turning of the frame.

The above, and other objects, features and advantages of the invention, will be apparent in the following detailed description of an illustrative embodiment which is to be read in connection with the accompanying drawings.

DESCRIPTION OF THE PREFERRED EMBODIMENT

Figure 1:
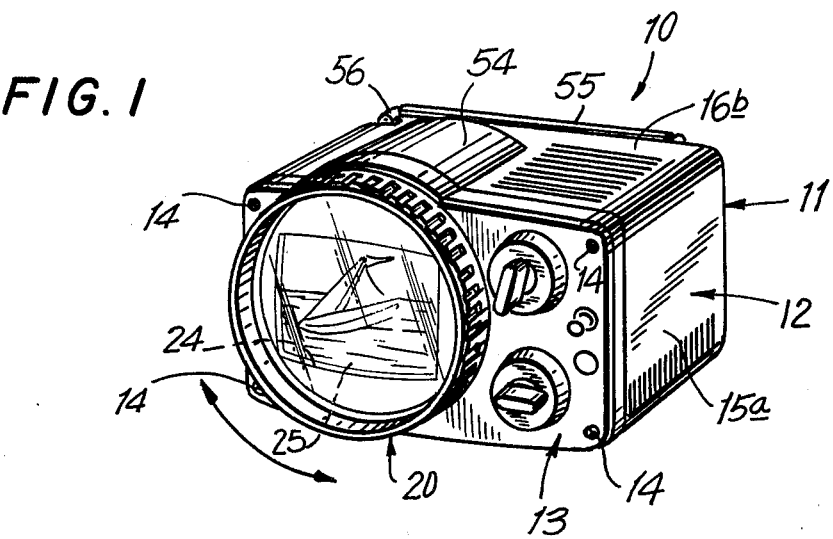
FIG. 1 is a perspective view showing a television receiver according to an embodiment of this invention in one of the possible positions of the receiver for viewing thereof.
Figure 2:
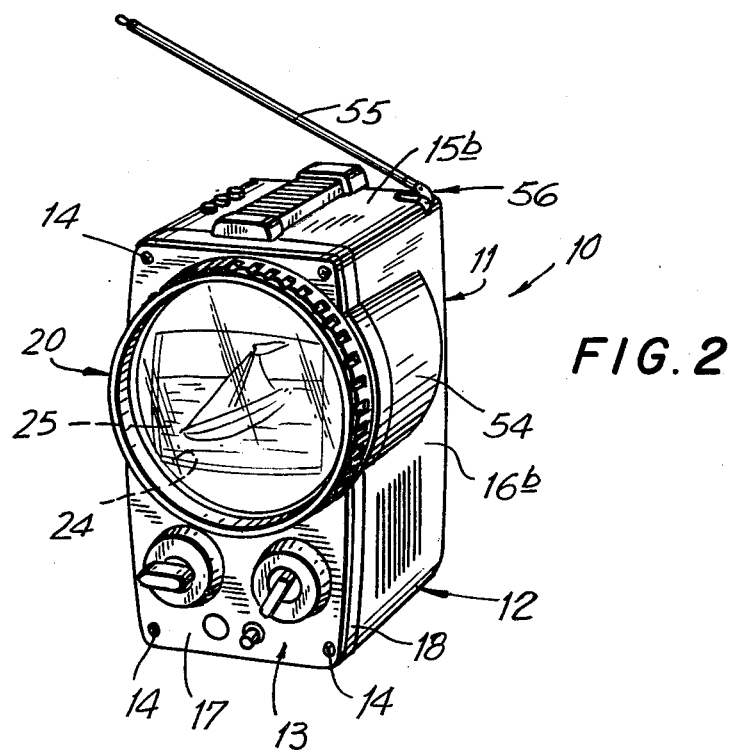
FIG. 2 is a perspective view similar to that of FIG. 1, but showing the television receiver according to this invention in another of the positions thereof for viewing of the produced television picture or image.

Referring to the drawings in detail, and initially to FIGS. 1 and 2 thereof, it will be seen that a television receiver 10 in accordance with this invention is there shown to comprise a cabinet 11 made up of a main body 12 of generally rectangular, box-like configuration which is open at the front, and a panel 13 which closes the open front of main body 12 and is secured in position, as by screws 14. The main body 12 of cabinet 11 is shown to include a pair of opposed first side walls 15a and 15b extending rearwardly from front panel 13 (FIGS. 1 and 2) and a pair of opposed second side walls 16a (FIG. 5) and 16b (FIGS. 1 and 2) also extending rearwardly from panel 13 between the first side walls 15a and 15b to define the box-like configuration of body 12 with corners being developed at the junctions of walls 15a and 15b with walls 16a and 16b. It will be apparent that cabinet 11 is adapted to rest alternatively on one of the first side walls 15a and 15b, for example, on the wall 15a as shown on FIG. 2, or on one of the second side walls 16a and 16b, for example, on the wall 16a as shown on FIG. 1. As shown, the walls 15a and 15b may be relatively narrow while the walls 16a and 16b are relatively wide. Thus, when cabinet 11 rests on wall 16a in the position shown on FIG. 1, the receiver 10 can be accommodated in a space of relatively small height, whereas, when the cabinet 11 rests on wall 15a in the position shown on FIG. 2, the television receiver can be accommodated in a relatively narrow space.

Figure 4:
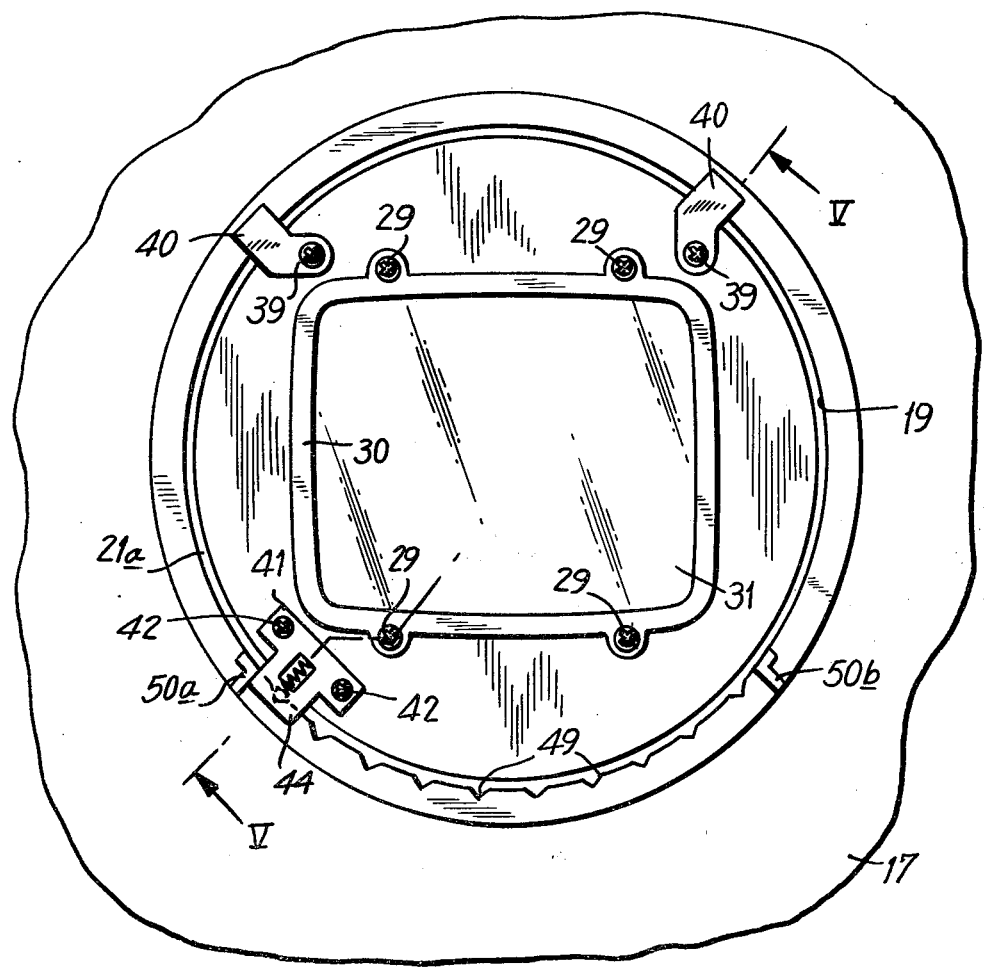
FIG. 4 is an elevational view of the structure provided in accordance with this invention for rotatably mounting the cathode ray tube within the cabinet as viewed from within the cabinet.
Figure 5:
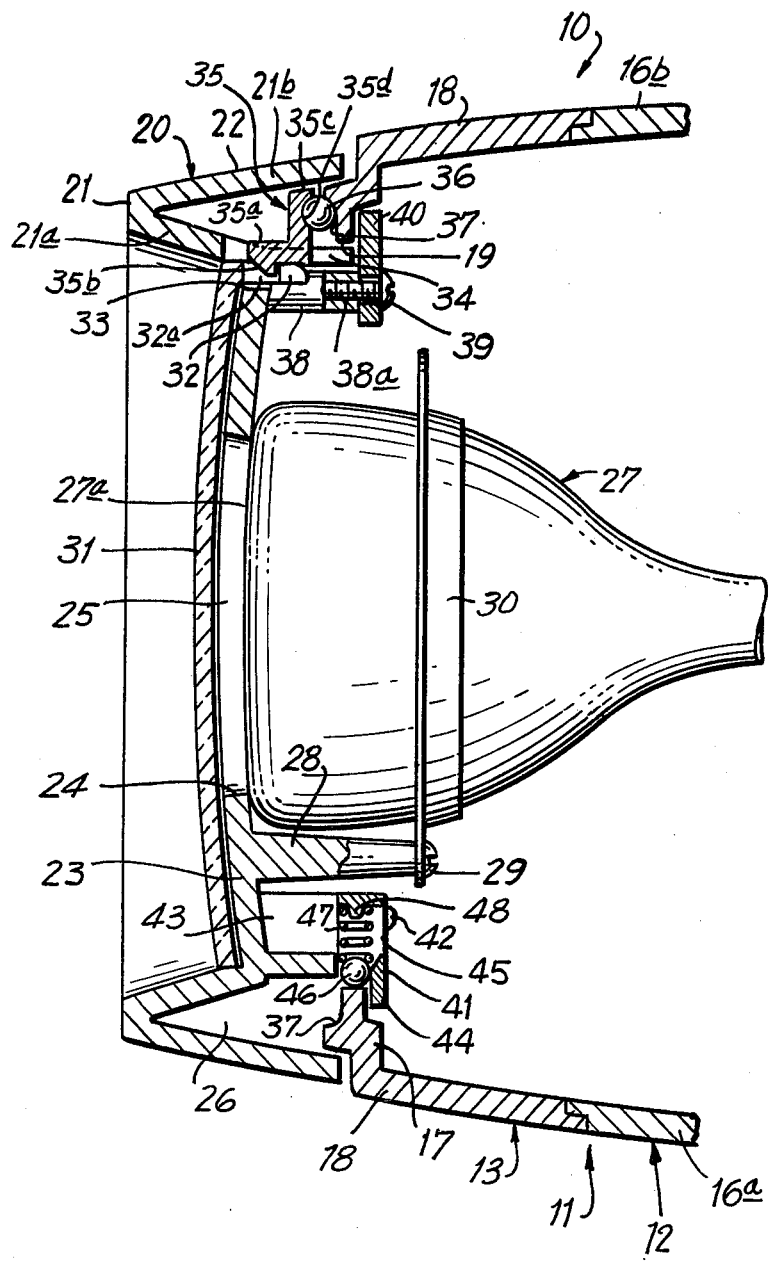
FIG. 5 is a detail sectional view taken along the line V—V on FIG. 4, and which is drawn on an enlarged scale.

The front panel 13 of cabinet 11 is shown to include a substantially planar wall 17 and a rearwardly directed rim 18 extending from the periphery of wall 17 and shaped for interfitting, mating engagement with the forward edge of main body 12, as shown particularly on FIG. 5. Wall 17 of front panel 13 has a circular opening 19 (FIG. 4) formed therein, and a frame 20 is mounted on panel 13, as hereinfter described in detail, for rotation about the center of circular opening 19.

As shown particularly on FIG. 5, frame 20 includes an annular portion 21 with a substantially cylindrical outer surface 22 thereon, and a flange portion 23 directed inwardly from annular portion 21 and having a substantially rectangularly inner periphery 24 defining a window 25. The annular portion 21 of frame 20 is preferably composed of inner and outer substantially cylindrical walls 21a and 21b, respectively, which are joined at the front of frame 20 and diverge rearwardly so as to form an annular, rearwardly opening cavity 26 between walls 21a and 21b. The flange portion 23 is shown to extend from inner cylindrical wall 21a intermediate the axial length of the latter.

The receiver 10 further comprises the usual cathode ray tube 27 (FIG. 5) located within cabinet 11 and securely attached to frame 20 with the usual rectangular face or screen 27a of cathode ray tube 27 being exposed to view through the rectangular window 25 in flange portion 23. In order to secure cathode ray tube 27 to frame 20, the latter is provided with pairs of laterally spaced apart relatively long posts 28 extending rearwardly from flange portion 23 adjacent the opposed, relatively long edges of rectangular window 25 and having tapped bores (not shown) for receiving screws 29 which secure a rectangular bracket 30 (FIGS. 4 and 5) to the back ends of post 28. The bracket 30 is engageable around the funnel-like portion of the picture tube envelope and is thereby effective to secure tube 27 to frame 20 with the face plate or screen 27a of the tube bearing against the back surface of flange portion 23 adjacent the edge 24 thereof. It will be seen that, with cathode ray tube 27 secured to frame 20 by bracket 30, the part of annular portion 21 of the frame which is disposed in front of flange portion 23 acts as a hood for shielding or shading the screen of face plate 27a of the tube from ambient light falling thereon.

Figure 3:
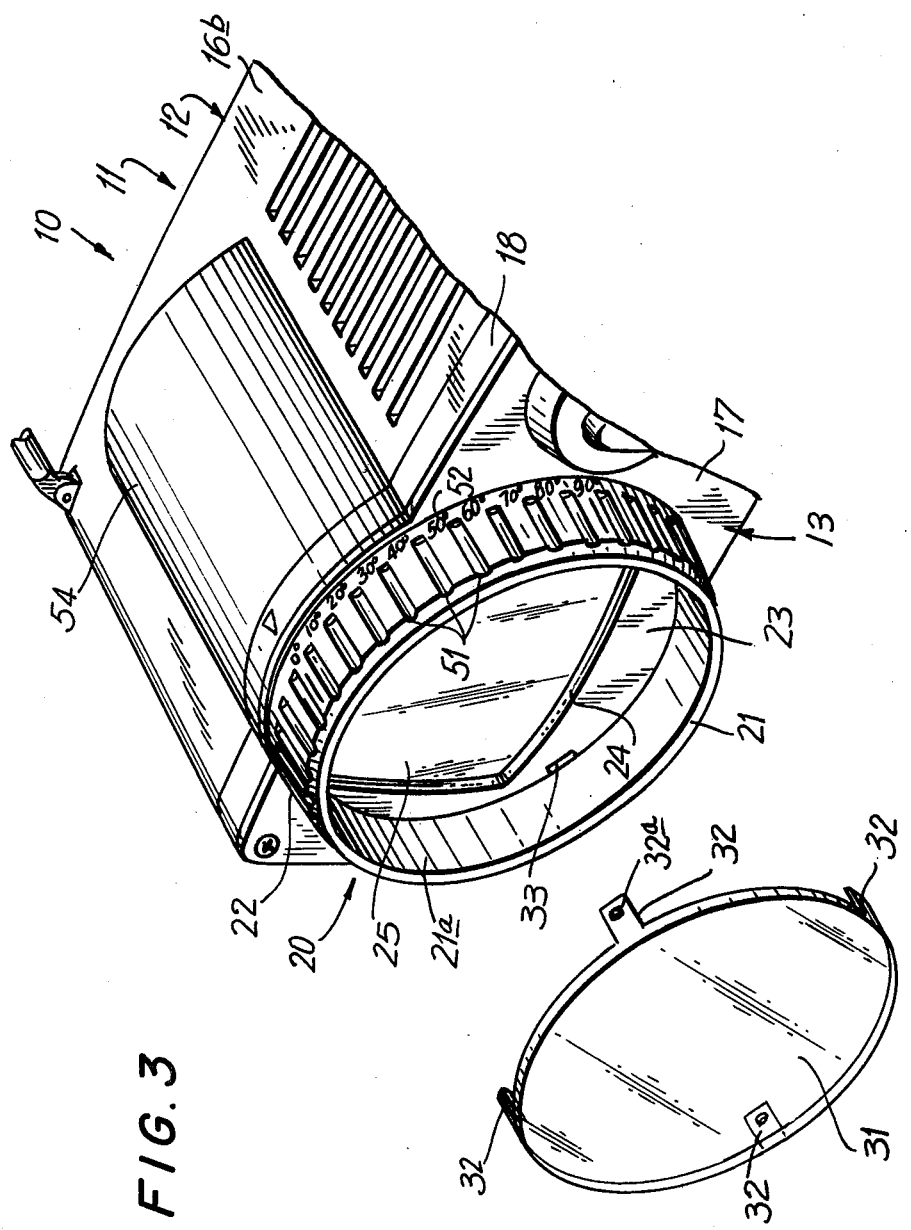
FIG. 3 is an enlarged, exploded perspective view of several of the parts included in the television receiver of FIGS. 1 and 2.

A protective transparent plate 31 which may be circular, as shown on FIG. 3, is disposed within the annular portion 21 of frame 20 against the forward surface of flange portion 23 so as to cover window 25 and thereby protect the face plate of cathode ray tube 27 exposed at such window. The transparent plate 31 may have light filtering characteristics and is preferably secured in position by means of four equally spaced apart legs 32 directed rearwardly from the periphery of plate 31 and being received in similarly spaced apart apertures 33 formed in flange portion 23 immediately adjacent the inner cylindrical wall 21a of annular portion 21.

The inner cylindrical wall 21a of frame 20 has four axial slots 34 extending rearwardly therein from frame portion 23 in registration with the four apertures 33. As shown in particular on FIG. 5, in which only one of the axial slots 34 appears, an L-shaped ball-holder 35 is provided for each of the slots 34 and has one arm 35a slidably received in the respective slot 34. The arm 35a of each holder 35 has a rearwardly slanted retaining nose 35b adapted to snap into a recess 32a in the leg 32 of plate 31 extending rearwardly through the respective adjacent aperture 33. The other leg 35c of each L-shaped ball-holder 35 is directed radially outward in annular cabity 26 and has a rearwardly facing socket 35d which receives a respective ball bearing 36. The ball bearings 36 positioned by ball holders 35 are in rolling engagement with a forwardly facing ball race 37 formed on the forwardly facing surface of panel wall 17 about circular opening 19. Frame 20 is held against panel 13 with ball bearings 36 between ball-holders 35 and ball race 37 by means of two relatively short posts 38 extending rearwardly from flange portion 23 adjacent the opposite ends of one of the relatively long edges of rectangular window 25 and have tapped bores 38a (FIG. 5) for receiving screws 39 by which retaining elements 40 are secured to the back ends of short posts 38. As shown on FIG. 4, the retaining elements 40, when secured to posts 38, are engageable in back of panel wall 17 adjacent the edge of the latter defining circular opening 19 for preventing forward separation of frame 20 from cabinet 11.

Figure 6:
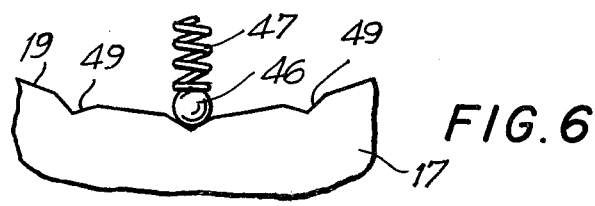
FIG. 6 is a detailed sectional view taken along the line VI—VI on FIG. 5 for illustrating details of a detent mechanism.

Forward separation of frame 20 from cabinet 11 is further prevented by a detent housing 41 (FIGS. 4 and 5) secured, as by screws 42, to a boss 43 (FIG. 5) extending rearwardly from flange portion 23 of frame 20 and being contiguous to the inner cylindrical wall 21a. Detent housing 41 is shown to have a radially outwardly directed lip 44 which is engageable in back of panel wall 17 adjacent the edge of the latter defining circular opening 19. Detent housing 41 further has a cavity 45 which opens radially outward toward the edge of panel wall 17 and which accommodates a detent ball 46 urged against the adjacent edge of wall 17 by means of a compression spring 47 disposed in cavity 45 between ball 46 and a spring anchor 48 (FIG. 5). As shown on FIGS. 4 and 6, the edge of panel wall 17 defining circular opening 19 has a series of notches or recesses 49 therein which are spaced apart within a predetermined range of angular movement of detent housing 41 with frame 20 relative to cabinet 11. It will be apparent that, as frame 20 is turned within the predetermined range of its angular movement, detent ball 46 is engageable successively in the recesses or notches 49 for providing yieldable resistance to turning of the frame relative to the cabinet at the respective angularly spaced apart locations. As shown on FIG. 4, the range of the permissible turning of frame 20 relative to cabinet 11 is predetermined by a pair of stop elements 50a and 50b which are angularly spaced apart, for example, by 90°, on the rearwardly facing surface of panel wall 17 adjacent the edge of the latter defining circular opening 19 so as to be selectively engageable by detent housing 41. Thus, detent housing 41 is engageable with either stop element 50a or stop element 50b to also form part of a stop means for limiting the turning of frame 20 and cathode ray tube 27 relative to cabinet 11 to within the predetermined angular range of, for example, 90°.

In order to facilitate the grasping of outer surface 22 of frame 20 for turning the latter relative to cabinet 11, the generally cylindrical surface 22 is formed with axially directed, circumferentially spaced grooves 51 (FIG. 3). Further, surface 22 may have imprinted thereon a scale 52 intended to cooperate with an index or arrow 53 on the rim 18 of panel 13 for indicating the angular orientation of frame 20 and cathode ray tube 27 relative to cabinet 11.

If desired, and as shown particularly on FIGS. 1–3, the outer diameter of frame 20 may be greater than the width of side walls 15a and 15b of cabinet 11. In such case, at least side wall 16b of cabinet body 12 is preferably formed with an arcuate protrusion 54 which is smoothly faired into the remainder of wall 16b and is aligned with the outer periphery of frame 20. Thus, the television receiver 10 is given a pleasing appearance, while the width of its sidewalls 15a and 15b is minimized to provide a relatively compact cabinet 11.

The stop elements 50a and 50b (FIG. 4) may be disposed so that the respectively defined limits of the turning of frame 20 relative to cabinet 11 correspond to the top of the image or picture displayed at window 25 facing in the direction toward wall 16b of the cabinet, as on FIG. 1, or facing toward wall 15b of the cabinet, as on FIG. 2. thus, the outer cylindrical grooved surface 22 of frame 20 may be simply grasped for turning frame 20 and the cathode ray tube 27 secured thereto so as to dispose the displayed image or picture for comfortable viewing thereof with the cabinet 11 resting on its side wall 16a (FIG. 1) or on its side wall 15a (FIG. 2). It is further to be noted that, with cabinet 11 resting on its side wall 16a, as on FIG. 1, frame 20 can be turned through 90° from the position relative to the cabinet 11 shown on FIG. 1, for example, to the relative cabinet shown on FIG. 2, so as to permit the convenient viewing of the displayed image or picture by a person lying on his side. In any event, by reason of the described configuration of frame 20 and the manner in which such frame is rotatably attached to cabinet 11, the frame 20 and cathode ray tube can be smoothly turned through the full range of the permissible angular movement thereof. Moreover, the detent ball 46 is cooperative with the notches or recesses 49 for holding the frame at any one of a plurality of selected positions between the limits of its angular movement relative to the cabinet.

The television receiver 10 according to this invention is further shown to include a telescopic rod antenna 55 which is mounted on cabinet 11 by means of a universal connection 56 at the corner of the cabinet which is defined between the orthogonally related side walls 15b and 16b. By reason of the mounting of antenna 55 at the corner of the cabinet defined between side walls 15b and 16b which are opposite to the walls 15a and 16a, respectively, on which the cabinet is designed to selectively rest, antenna 55 is adapted to be extended in any desired direction for obtaining good reception of the broadcast signals whether cabinet 11 is disposed in the position shown on FIG. 1 or the position shown on FIG. 2.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A television receiver comprising a cabinet having a panel with a circular opening in the latter; a frame having a generally cylindrical outer surface; means mounting said frame on said panel for rotation about the center of said circular opening with said cylindrical outer surface projecting from said panel; a cathode ray tube within said cabinet; means attaching said cathode ray tube to said frame for rotation with the latter; cooperatively engageable stop means on said cabinet and frame, respectively, for limiting the turning of said frame and cathode ray tube relative to said cabinet to within a predetermined angular range; and cooperative detent means on said frame and cabinet, respectively, for providing yieldable resistance to turning of said frame relative to said cabinet at a plurality of angularly spaced apart locations within said range.

2. A television receiver according to claim 1; in which said stop means includes two angularly spaced apart stop elements secured to said panel adjacent said edge defining the circular opening, and abutment means on said frame selectively engageable with said stop elements for limiting said turning to within said range.

3. A television receiver according to claim 1; in which said panel is at the front of said cabinet which further includes a pair of opposed first walls extending rearwardly from said panel and a pair of opposed second walls also extending rearwardly from said panel between said first walls to define corners of said cabinet between said first and second walls; said cabinet is adapted to rest alternatively on one of said first walls or on one of said second walls; and further comprising an antenna, and universal connecting means connecting said antenna to said cabinet at the corner of the latter defined between the others of said first and second walls.

4. A television receiver according to claim 1; in which said detent means includes a series of spaced apart recesses in an edge of said panel defining said circular opening, and means on said frame engaging said edge of the panel and being resiliently urged into said recesses.

5. A television receiver according to claim 4; in which said means on the frame includes a detent ball, a ball housing secured to said frame and movably receiving said detent ball, and a spring in said housing urging said ball outwardly in respect to said housing against said edge of the panel.

6. A television receiver according to claim 5; in which said stop means includes two angularly spaced apart stop elements secured to said panel adjacent said edge defining the circular opening and being selectively engageable by said ball housing of the detent means for limiting said turning to within said range.

7. A television receiver according to claim 1; in which said means mounting said frame on said panel includes a forwardly facing ball race on said panel about said circular opening, a plurality of ball-holders mounted on said frame at angularly spaced apart locations, ball-bearings positioned by said ball-holders in rolling contact with said race, and a plurality of retaining elements secured to said frame and engageable in back of said panel adjacent the edge of the latter defining said circular opening for preventing forward separation of said frame from the cabinet.

8. A television receiver according to claim 7; in which said detent means includes a series of spaced apart recesses in said edge of the panel defining said circular opening, a detent ball housing secured to the back of said flange and having a detent ball movable therein for engagement in said recesses of said edge, and a spring in said housing urging said ball against said edge; and said detent ball housing has a projecting lip engaging in back of said panel adjacent said edge of the latter to cooperate with said retaining elements for preventing said forward separation of the frame from the cabinet.

9. A television receiver according to claim 7; in which said frame includes inner and outer substantially cylindrical walls joined at the front of the frame, a flange portion directed inwardly from said inner cylindrical wall intermediate the axial length of the latter and defining a window at which said cathode ray tube is exposed to view; said inner cylindrical wall having axial slots therein in back of said flange and in which said ball-holders are mounted, and rearwardly directed posts extending from said flange through said circular opening and having said retaining elements secured thereto.

10. A television receiver according to claim 9; further comprising a protective transparent plate engageable against said flange at the front of the latter for covering said window, said plate having a plurality of legs directed rearwardly therefrom, said flange having apertures therein adjacent said slots through which said legs extend rearwardly, said legs having respective recesses, and said ball-holders having latching noses engageable in said recesses of the adjacent legs of said protective plate for securing the latter to said frame.

11. A television receiver according to claim 1; in which said frame includes an annular portion with said cylindrical outer surface thereon, and a flange portion directed inwardly from said annular portion and having a substantially rectangular inner periphery defining a window; and said cathode ray tube has a substantially rectangular face plate and is mounted in respect to said frame for exposing said face plate at said window.

12. A television receiver according to claim 11; further comprising a protective transparent plate covering said window for protecting said face plate of the cathode ray tube.

13. A television receiver according to claim 12; in which said flange has a plurality of apertures therein, and said protective plate has legs extending therefrom and engaging in said apertures for securing said plate to said frame.

14. A television receiver according to claim 11; in which said annular portion of the frame includes inner and outer substantially cylindrical walls, and said flange portion extends from said inner cylindrical wall intermediate the axial length of the latter.

15. A television receiver according to claim 14; in which cylindrical outer surface of the frame is provided on said outer cylindrical wall and is formed with axially directed, circumferentially spaced grooves by which said outer wall may be securely grasped for turning said frame relative to the cabinet.

16. A television receiver according to claim 15; further comprising cooperative index and scale means on said panel and outer cylindrical wall, respectively, for indicating the angular orientation of said frame and cathode ray tube relative to said cabinet.

* * * * *